(12) United States Patent
Tsutsumi et al.

(10) Patent No.: US 9,389,398 B2
(45) Date of Patent: *Jul. 12, 2016

(54) IMAGING LENS, AND IMAGING APPARATUS INCLUDING THE IMAGING LENS

(71) Applicant: FUJIFILM Corporation, Tokyo (JP)

(72) Inventors: Katsuhisa Tsutsumi, Saitama-ken (JP); Yoshiaki Ishii, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 14/171,149

(22) Filed: Feb. 3, 2014

(65) Prior Publication Data

US 2014/0146405 A1 May 29, 2014

Related U.S. Application Data

(63) Continuation of application No. PCT/JP2012/004331, filed on Jul. 4, 2012.

(30) Foreign Application Priority Data

Aug. 25, 2011 (JP) ................... 2011-183589

(51) Int. Cl.
*G02B 13/04* (2006.01)
*G02B 13/00* (2006.01)
*G02B 9/12* (2006.01)

(52) U.S. Cl.
CPC *G02B 13/04* (2013.01); *G02B 9/12* (2013.01); *G02B 13/005* (2013.01); *G02B 13/006* (2013.01)

(58) Field of Classification Search
CPC ............ G02B 13/04; G02B 9/12; G02B 9/34; G02B 13/0045; G02B 13/005; G02B 13/006
USPC .......................... 359/753, 781–782, 787–788
See application file for complete search history.

(56) References Cited

U.S. PATENT DOCUMENTS

| 4,674,844 A | * | 6/1987 | Nishioka et al. ............... 359/782 |
| 4,986,642 A | | 1/1991 | Yokota et al. |
| 5,463,499 A | | 10/1995 | Ito et al. |
| 5,760,973 A | * | 6/1998 | Kawamura .................... 359/753 |

(Continued)

FOREIGN PATENT DOCUMENTS

| JP | 01-134324 | 5/1989 |
| JP | 05-188293 | 7/1993 |

(Continued)

OTHER PUBLICATIONS

International Search Report, PCT/JP2012/004331, Sep. 18, 2012.

*Primary Examiner* — Jordan Schwartz
(74) *Attorney, Agent, or Firm* — Young & Thompson

(57) ABSTRACT

An imaging lens substantially consists of a negative first lens group and a positive second lens group in this order from the object side. The first lens group substantially consists of only a first lens, which is one biconcave lens. The second lens group substantially consists of, in the following order from the object side: a cemented lens, which is formed by bonding a positive lens and a negative lens, in this order from the object side, and which has a positive refractive power as a whole; an aperture stop; a positive lens; and a negative lens. The imaging lens is configured to satisfy the conditional expressions (1a): $0<f23/f<2.5$ and (2a): $0<f45/f<6$ at the same time.

21 Claims, 6 Drawing Sheets

(56) References Cited

U.S. PATENT DOCUMENTS

| | | |
|---|---|---|
| 5,793,532 A | 8/1998 | Kawamura |
| 5,850,312 A | 12/1998 | Kato et al. |
| 5,886,827 A * | 3/1999 | Ryzhikov ............... G02B 21/02 |
| | | 359/656 |
| 8,611,017 B2 | 12/2013 | Mimura et al. |
| 2004/0125469 A1* | 7/2004 | Miyano ..................... 359/783 |
| 2004/0240080 A1 | 12/2004 | Matsui et al. |
| 2006/0058581 A1* | 3/2006 | Hanke ................ A61B 1/00183 |
| | | 600/109 |
| 2006/0279851 A1 | 12/2006 | Yasui |

FOREIGN PATENT DOCUMENTS

| | | |
|---|---|---|
| JP | 07-120677 | 5/1995 |
| JP | 07-253542 | 10/1995 |
| JP | 08-068940 | 3/1996 |
| JP | 2001-356265 | 12/2001 |
| JP | 2006-343552 | 12/2006 |
| JP | 2009-223251 | 10/2009 |
| WO | WO 2004/107009 | 12/2004 |

* cited by examiner

EXAMPLE 1

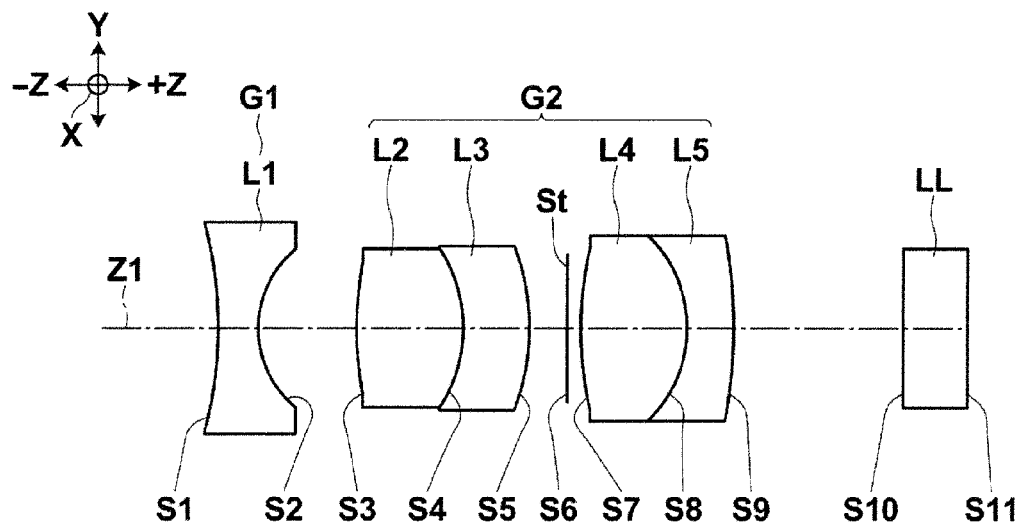
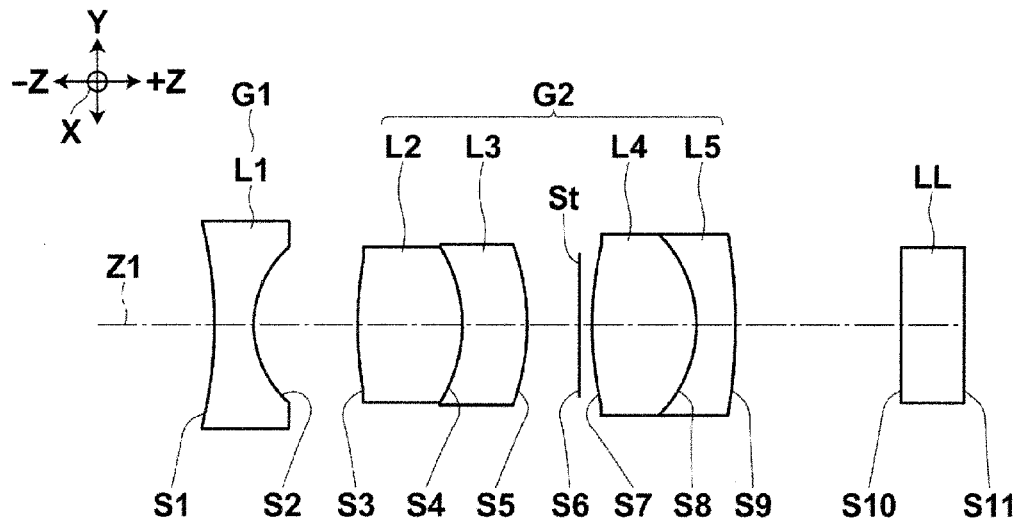

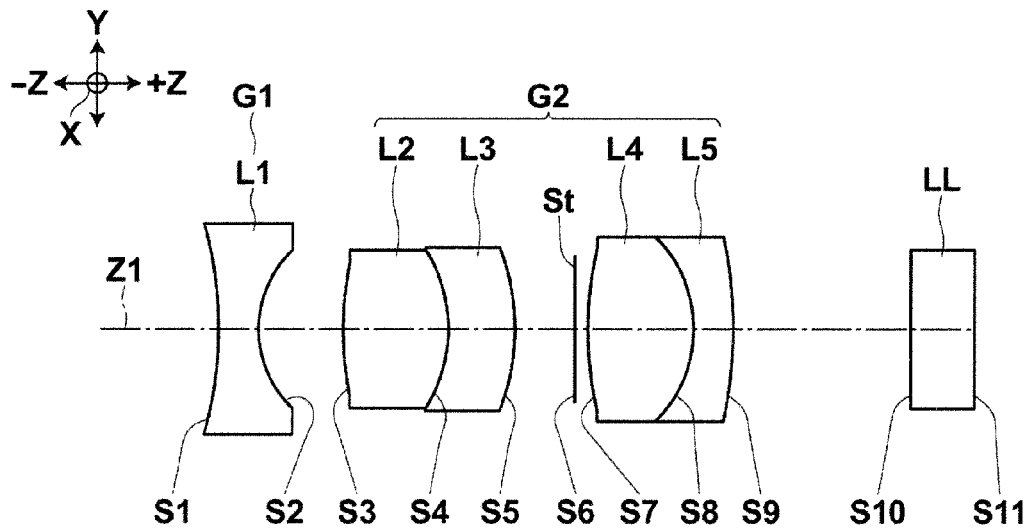
FIG.5 EXAMPLE 4
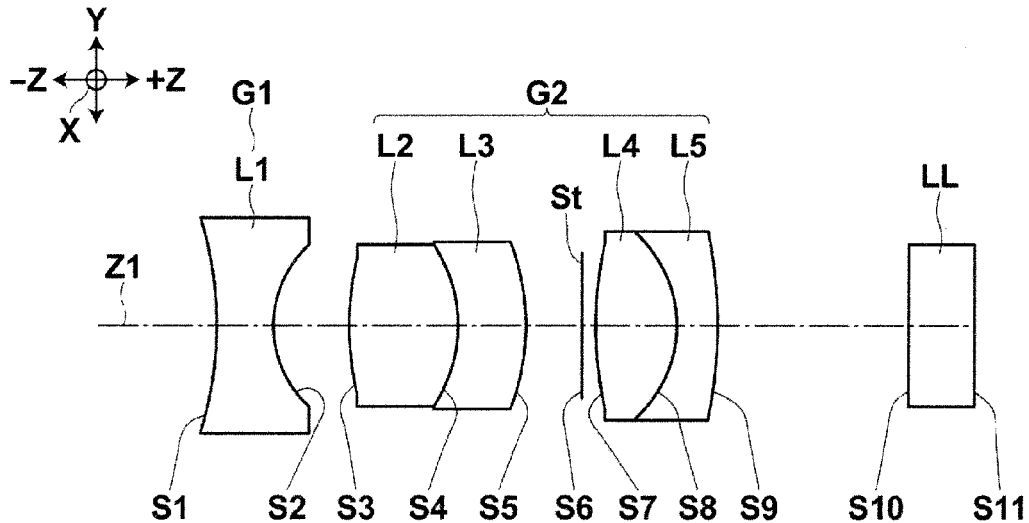
FIG.6 EXAMPLE 5

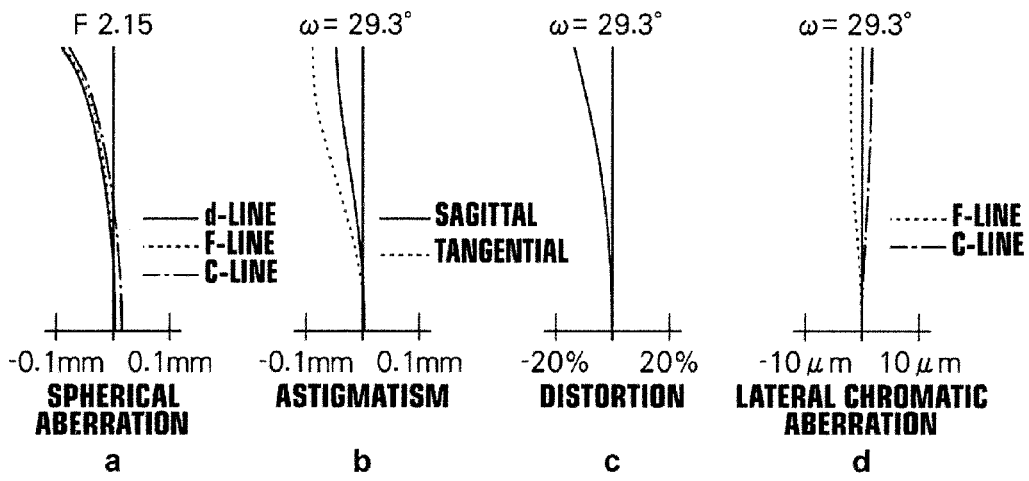
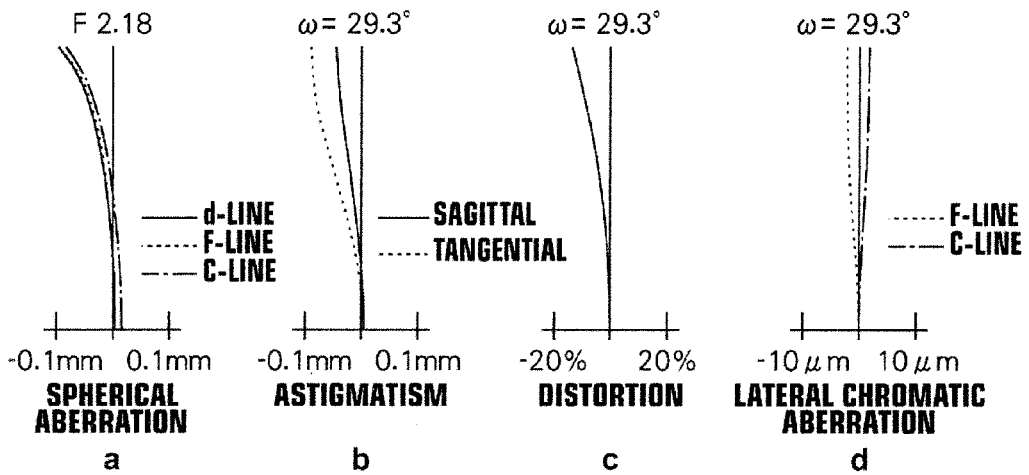

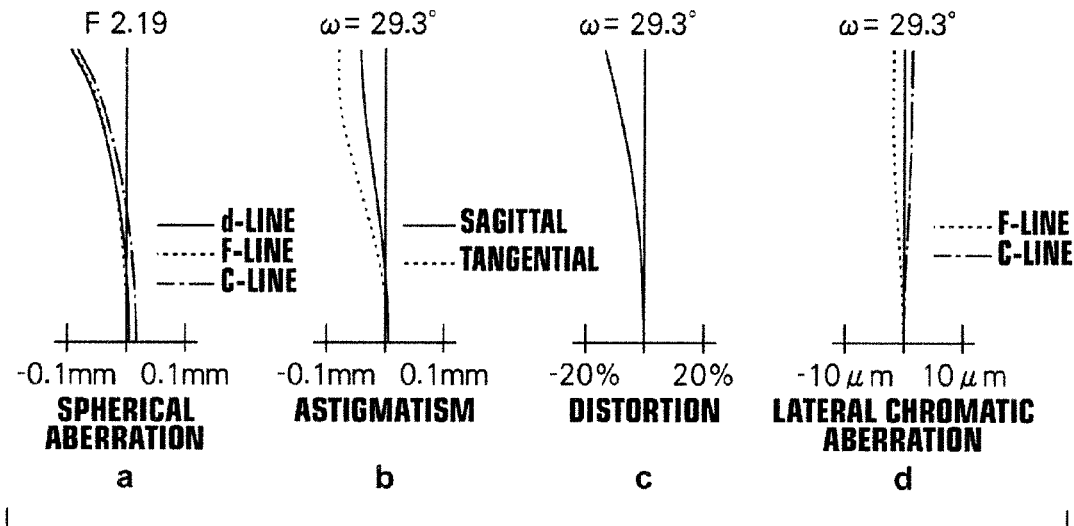
FIG.9 EXAMPLE 3
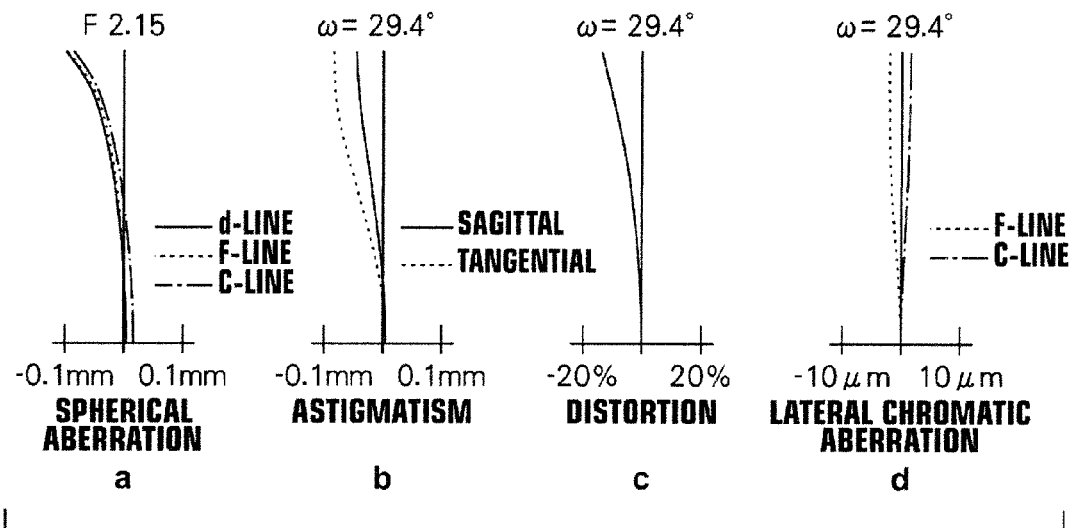
FIG.10 EXAMPLE 4

FIG.11
EXAMPLE 5
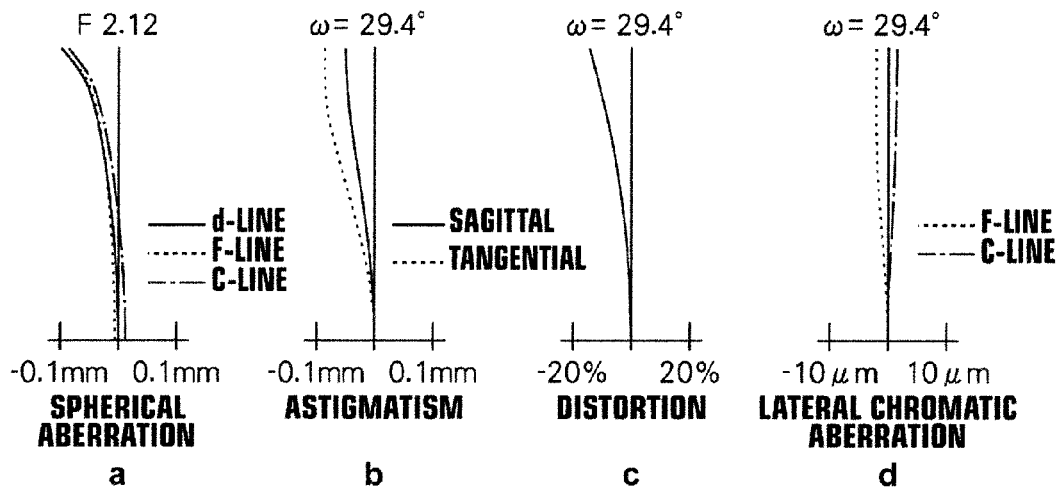
FIG.12
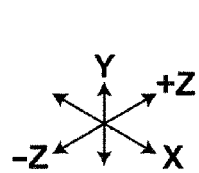
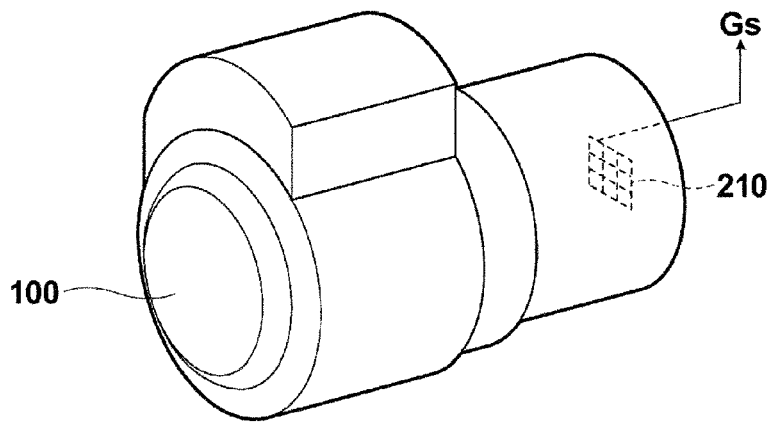

IMAGING LENS, AND IMAGING APPARATUS INCLUDING THE IMAGING LENS

CROSS REFERENCE TO RELATED APPLICATIONS

This application is a continuation of PCT/JP2012/004331 filed on Jul. 4, 2012, which claims foreign priority to Japanese Application No. 2011-183589 filed on Aug. 25, 2011. The entire contents of each of the above applications are hereby incorporated by reference.

BACKGROUND OF THE INVENTION

1. Field of the Invention

The present invention relates to an imaging lens and an imaging lens apparatus, and more particularly to an imaging lens used for surveillance cameras, portable terminal cameras, in-vehicle cameras and the like including imaging devices such as a CCD (Charge Coupled Device) and a CMOS (Complementary Metal Oxide Semiconductor), and an imaging apparatus including this imaging lens.

2. Description of the Related Art

Recently, devices that have been miniaturized greatly and have an increased number of pixels are known as imaging devices such as CCD's and CMOS's. Along with this, the main body of imaging instruments including these imaging devices has also been miniaturized, and imaging lenses to be mounted on the devices, which are miniaturized and improved to have favorable optical performance, have been applied. As imaging instruments for use as surveillance cameras, in-vehicle cameras and the like, those equipped with lenses, which have a wide angle of view, and yet which are compact and capable of high performance, are known.

For example, the imaging lenses as disclosed in the following Japanese Unexamined Patent Publication No. 1 (1989)-134324, Japanese Unexamined Patent Publication No. 7(1995)-253542, Japanese Unexamined Patent Publication No. 2001-356265, and U.S. Pat. No. 8,611,017 are known as imaging lenses having comparatively small numbers of lenses in the technical field described above.

SUMMARY OF THE INVENTION

However, it is difficult to correct aberrations in the imaging lens disclosed in Japanese Unexamined Patent Publication No. 1(1989)-134324 because an aperture is disposed on the image side of a surface of the most image side lens that constitutes the imaging lens. In the case that the imaging lens of Japanese Unexamined Patent Publication No. 1(1989)-134324 has an F-number of 4.0, the imaging lens can have a configuration that enables aberration correction. However, in the case that the F-number of the imaging lens is intended to be decreased, the outer diameter of the most object side lens will be excessively increased. In the imaging lens of Example 3 disclosed in Japanese Unexamined Patent Publication No. 1(1989)-134324, a convex lens which is a second lens does not have sufficient allowance with regard to clearance for the outer diameter thereof, and accordingly the imaging lens cannot be configured to correspond to a fast imaging lens.

The imaging lens of Example 2 disclosed in Japanese Unexamined Patent Publication No. 7(1995)-253542 given above has an F-number of 4, which is a slow lens, and further has large chromatic aberration and astigmatism, thereby being inappropriate for use in an imaging apparatus, in which the number of pixels has been increased.

The imaging lens of Example 5 disclosed in Japanese Unexamined Patent Publication No. 2001-356265 given above has an F-number of 3.6, which is a slow lens as well, and further has large chromatic aberration and astigmatism, and thereby is inappropriate for use in an imaging apparatus, in which the number of pixels has been increased.

The imaging lens of Example 5 as disclosed in U.S. Pat. No. 8,611,017 given above has an F-number of 3.25, which is a slow lens, and further has large chromatic aberration, astigmatism, and distortion, and thereby is inappropriate for use in imaging apparatuses which are required to increase the number of pixels.

As described above, there is demand to employ an imaging lens with an F-number of 2.2, which is a fast lens, in which longitudinal chromatic aberration is favorably corrected and which has favorable optical performance capable of corresponding to an increase in the number of pixels of an imaging device.

The present invention has been developed in view of the circumstances described above, and it is an object of the present invention to provide an imaging lens being compact with a low F-number and a wide angle of view, in which various aberrations are favorably corrected, and an imaging apparatus including the imaging lens.

A first imaging lens of the present invention includes in the recited order from an object side: a negative first lens group substantially consisting of only a first lens, which is a single biconcave lens, and a positive second lens group substantially consisting of a cemented lens that is formed by bonding a second lens, which is a positive lens, and a third lens, which is a negative lens, in this order from the object side and that has a positive refractive power as a whole; an aperture stop; a fourth lens, which is a positive lens; and a fifth lens which is a negative lens. The imaging lens satisfies conditional expressions (1a) and (2a) given below at the same time:

$$0 < f23/f < 2.5 \tag{1a}$$

and $$0 < f45/f < 6 \tag{2a},$$

where:

f23: the combined focal length of the second lens and the third lens;

f45: the combined focal length of the fourth lens and the fifth lens; and f: the focal length of the entire lens system.

It is desirable for the first imaging lens to satisfy the conditional expression (1a'): $0.6 < f23/f < 2$, and more desirably the conditional expression (1a''): $1 < f23/f < 1.8$. Further, it is desirable for the first imaging lens to satisfy the conditional expression (2a'): $0.5 < f45/f < 5.5$, and more desirably the conditional expression (2a''): $2 < f45/f < 5$.

A second imaging lens of the present invention includes in the recited order from an object side: a negative first lens group substantially consisting of only a first lens, which is a single negative lens, and a positive second lens group substantially consisting of a cemented lens that is formed by bonding a second lens, which is a positive lens, and a third lens, which is a negative lens, in this order from the object side and that has a positive refractive power as a whole; an aperture stop; a fourth lens, which is a positive lens; and a fifth lens which is a negative lens. The imaging lens simultaneously satisfies conditional expressions (1b) and (2b) given below:

$$0.9 < f23/f < 2.4 \tag{1b};$$

and $$2.8 < f45/f < 6 \tag{2b},$$

where:

f23: the combined focal length of the second lens and the third lens;

f45: the combined focal length of the fourth lens and the fifth lens; and f: the focal length of the entire lens system.

It is desirable for the second imaging lens to satisfy the conditional expression (1b'): $1<f23/f<2$, and more desirably the conditional expression (1b"): $1.1<f23/f<1.6$. Further, it is desirable for the second imaging lens to satisfy the conditional expression (2b'): $2.9<f45/f<5$, and more desirably the conditional expression (2b"): $3<f45/f<4.2$.

A third imaging lens of the present invention includes in the recited order from an object side: a negative first lens group substantially consisting of only a first lens, which is a single negative lens, and a positive second lens group substantially consisting of a cemented lens that is formed by bonding a second lens, which is a positive lens, and a third lens, which is a negative lens, in this order from the object side and that has a positive refractive power as a whole; an aperture stop; a fourth lens, which is a positive lens; and a fifth lens which is a negative lens. The imaging lens satisfies conditional expression (3a) given below:

$$0.9<fg2/f<1.8 \quad (3a),$$

where:

fg2: the focal length of the second lens group (the combined focal length of the second lens through the fifth lens); and f: the focal length of the entire lens system.

It is desirable for the third imaging lens to satisfy the conditional expression (3a'): $1<fg2/f<1.6$, and more desirably the conditional expression (3a"): $1.05<fg2/f<1.4$.

In each of the second and the third imaging lenses, the first lens may be a biconcave lens.

In each of the second and the third imaging lenses, the second lens may be a biconvex lens, the third lens may be a negative lens with a concave surface toward the object side, the fourth lens may be a biconvex lens, and the fifth lens may be a negative lens with a concave surface toward the object side.

In each of the second and the third imaging lenses, the third lens may be a meniscus lens.

In each of the second and the third imaging lenses, the fifth lens may be a meniscus lens.

The second and the third imaging lenses may include a cemented lens having a positive refractive power as a whole, formed by cementing the fourth lens and the fifth lens together.

Each of the first and the second imaging lenses may satisfy the conditional expression (3b): $0.5<fg2/f<2.5$. In this case, fg2 is the focal length (the combined focal length of the second lens through the fifth lens) of the second lens group, and f is the focal length of the entire lens system. It is desirable for the first and the second imaging lenses to satisfy the conditional expression (3b'): $0.9<fg2/f<1.8$, and more desirably the conditional expression (3b"): $1<fg2/f<1.3$.

Each of the first through the third lens imaging lenses may satisfy the conditional expression (4): $-2<f1/fg2<0$. In this case, f1 is the focal length of the first lens, and fg2 is the focal length of the second lens group (the combined focal length of the second lens through the fifth lens). It should be noted that it is desirable for the first through the third imaging lenses to satisfy the conditional expression (4'): $-1<f1/fg2<-0.5$, and more desirably the conditional expression (4"): $-0.9<f1/fg2<-0.6$.

It is desirable for the first through the third imaging lenses to satisfy the conditional expression (5): $1.5<(dsi)/f<3.2$. In this case, dsi is the distance (the back focus portion corresponds to the air conversion distance) between the aperture stop and the image formation surface on the optical axis, and f is the focal length of the entire lens system. It is desirable for the first through the third imaging lenses to satisfy the conditional expression (5'): $1.8<(dsi)/f<2.8$, and more desirably the conditional expression (5"): $2<(dsi)/f<2.5$.

It is desirable for the first through the third imaging lenses to satisfy the conditional expression (6): $0.42<(dsi)/L<1$. In this case, dsi is the distance (the back focus portion corresponds to the air conversion distance) between the aperture stop and the image formation surface on the optical axis, and L is the total optical length. It is desirable for the first through the third imaging lens to satisfy the conditional expression (6'): $0.45<(dsi)/L<0.9$, and more desirably the conditional expression (6"): $0.48<(dsi)/L<0.8$.

The imaging apparatus of the present invention is an apparatus including any of the first through the third imaging lenses.

The negative first lens group refers to a first lens group having a negative refractive power, and the positive second lens group refers to a second lens group having a positive refractive power. Further, the term "negative lens" refers to a lens having a negative refractive power, and the term "positive lens" refers to a lens having a positive refractive power.

Each of the first through the third imaging lenses may substantially consist of two lens groups. In this case, the expression "substantially consist of two lens groups" refers to an imaging lens that includes lenses substantially without any refractive power; optical elements other than lenses such as apertures and glass covers; and mechanical components such as lens flanges, lens barrels, imaging devices, and camera shake correction mechanisms; in addition to the two lens groups.

The air conversion back focus refers to the distance (air conversion distance) from a lens surface at the most image side of the imaging lens to the image formation surface (imaging surface) at the image side of the imaging lens. In the case that optical elements such as filters, glass covers, and the like, having no refractive power are arranged in between the lens surface at the most image side and the image formation surface, the back focus which has been subjected to the air conversion is obtained by air-converting the thickness of the optical elements.

dsi is the distance between the aperture stop and the image formation surface. Actual length is used for the distance between the aperture stop and the apex of the most image side surface of the lens in the imaging lens. The distance between the apex of the most image side surface of the lens and the image formation surface is determined by using the air conversion distance, i.e., the air conversion back focus.

In the case that optical elements such as filters, cover glasses, and the like which have no refractive power are arranged within the air conversion distance, the distance is determined by air-converting a thickness of such optical elements. It should be noted that unless the optical elements having no refractive power are arranged within the distance, the distance is only the air distance.

The total optical length L is a distance between a lens surface on the most object side of the imaging lens and the image formation surface (imaging surface) on the image side of the same imaging glens. Note that actual length is used for the distance between a lens surface on the most object side and a lens surface on the most image side, which constitute the imaging lens. The distance from the lens surface on the most image side to the image formation surface is determined by using the air conversion back focus.

In the case that lenses having aspherical surfaces are used for the imaging lens, whether an aspherical surface is concave or convex, whether the refractive power thereof is negative or positive, and whether the radius of curvature thereof is negative or positive are defined by whether the aspherical surface is concave or convex, whether the refractive power is negative or positive, and whether the radius of curvature is negative or positive in the paraxial region of the aspherical surface.

The first imaging lens and the imaging apparatus of the present invention include in the recited order from an object side: a negative first lens group consisting of only a first lens, which is a single biconcave lens, and a positive second lens group substantially consisting of a cemented lens, which is formed by bonding a positive lens and a negative lens in this order from the object side and which has a positive refractive power as a whole; an aperture stop; a positive lens; and a negative lens. The imaging lens satisfies conditional expressions (1a) and (2a) given below at the same time:

$$0 < f23/f < 2.5 \quad (1a);$$

and $$0 < f45/f < 6 \quad (2a).$$

This enables favorable correction of various aberrations, while being fast and compact with a wide angle view.

The second imaging lens and the imaging apparatus of the present invention include in the recited order from an object side: a negative first lens group consisting of only a first lens, which is a single negative lens, and a positive second lens group substantially consisting of a cemented lens, which is formed by bonding a positive lens and a negative lens in this order from the object side and which has a positive refractive power as a whole; an aperture stop; a positive lens; and a negative lens. The imaging lens simultaneously satisfies conditional expressions (1b) and (2b) given below:

$$0.9 < f23/f < 2.4 \quad (1b);$$

and $$2.8 < f45/f < 6 \quad (2b).$$

This enables favorable correction of various aberrations, while being fast and compact with a wide angle view.

The third imaging lens and the imaging apparatus of the present invention include in the recited order from an object side: a negative first lens group consisting of only a first lens, which is a single negative lens, and a positive second lens group substantially consisting of a cemented lens, which is formed by bonding a positive lens and a negative lens in this order from the object side and which has a positive refractive power as a whole; an aperture stop; a positive lens; and a negative lens. The imaging lens simultaneously satisfies conditional expression (3a) given below:

$$0.9 < fg2/f < 1.8 \quad (3a).$$

This enables favorable correction of various aberrations, while being fast and compact with a wide angle view.

The operations and advantageous effects of each of the conditional expressions will be described later.

BRIEF DESCRIPTION OF THE DRAWINGS

FIG. 3 is a cross-sectional view of a schematic configuration of an imaging lens of Example 2.

FIG. 4 is a cross-sectional view of a schematic configuration of an imaging lens of Example 3.

FIG. 5 is a cross-sectional view of a schematic configuration of an imaging lens of Example 4.

FIG. 6 is a cross-sectional view of a schematic configuration of an imaging lens of Example 5.

FIG. 7 shows aberration diagrams a through d of the imaging lens of Example 1.

FIG. 8 shows aberration diagrams a through d of the imaging lens of Example 2.

FIG. 9 shows aberration diagrams a through d of the imaging lens of Example 3.

FIG. 10 shows aberration diagrams a through d of the imaging lens of Example 4.

FIG. 11 shows aberration diagrams a through d of the imaging lens of Example 5.

FIG. 12 illustrates a surveillance camera provided with the imaging lens of the present invention.

DESCRIPTION OF THE PREFERRED EMBODIMENTS

Hereinafter, embodiments of the imaging lens and the imaging apparatus including the imaging lens of the present invention will be described with reference to the accompanying drawings.

Figure 1:
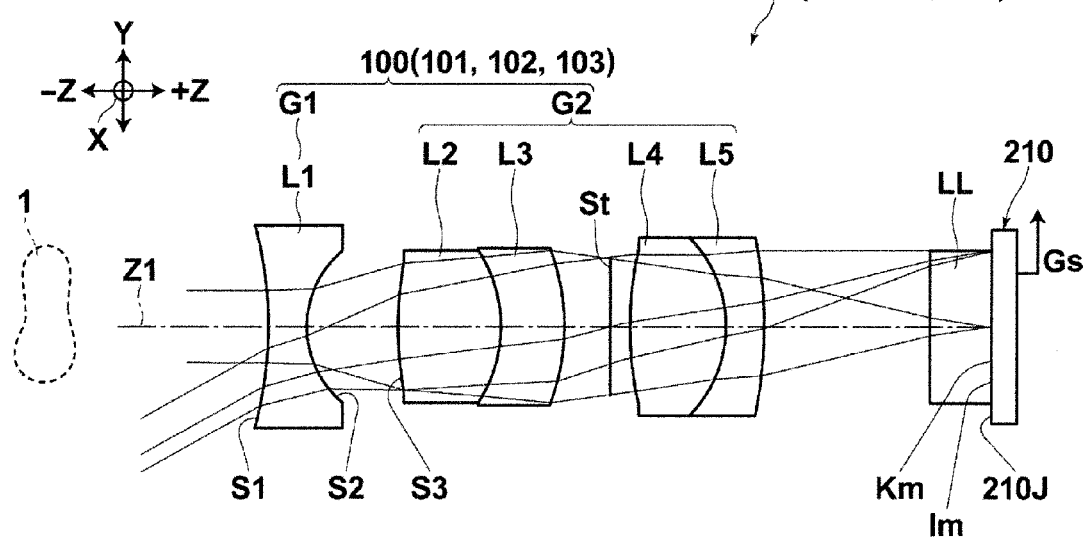
FIG. 1 is a cross-sectional view of a schematic configuration of an imaging lens and imaging apparatus of an embodiment of the present invention.

FIG. 1 illustrates a cross-sectional view of a schematic configuration of the imaging apparatus including the imaging lens of an embodiment of the present invention together with the optical path of light passing through the imaging lens. Note that arrows X, Y, and Z indicate three directions which are perpendicular to one another, as do arrows X, Y, and Z of FIGS. 2 through 6 to be described later. The arrows Z indicate the same direction as that of an optical axis Z1.

An imaging lens 100 as shown in FIG. 1 is common among three types of embodiments including an imaging lens 101 of the first embodiment through an imaging lens 103 of the third embodiment. Similarly, an imaging apparatus 200 as shown in FIG. 1 is common among three types of embodiments including an imaging apparatus 201 of the first embodiment through an imaging apparatus 203 of the third embodiment equipped with the above imaging lenses 101 through 103, respectively.

As described above, the imaging lenses 101 through 103 are collectively referred to as the imaging lens 100. Further, the imaging apparatuses 201 through 203 are collectively referred to as the imaging apparatus 200.

The imaging apparatus 200 as shown in the Figures includes an imaging device 210, which is a solid state imaging device such as a CCD, a CMOS, and the like, and the imaging lens 100 with a fixed focal length. The imaging apparatus 200 is applied to digital cameras, surveillance cameras, portable terminal cameras, in-vehicle cameras, and readout cameras intended for sensing defects and identifying individual objects, for example.

The imaging device 210 converts an optical image Im representing a subject 1, which has been imaged on a light receiving surface 210J of the imaging device 210 through the imaging lens 100, into an electrical signal to output an image signal Gs representing the optical image Im. The imaging apparatus 200 is configured such that an image formation surface Km formed by the imaging lens 100 is positioned on the light receiving surface 210J of the imaging device 210.

The imaging lens 100 includes a negative first lens group G1 and a positive second lens group, in this order from the object side. The first lens group G1 consists of only a first lens L1 which is a negative lens. The second lens group G2 substantially consists of a cemented lens, which are formed by bonding a positive second lens L2 and a negative third lens L3 in this order from the object side and which has a positive refractive power as a whole; an aperture stop St; a fourth lens L4 which is a positive lens; and a fifth lens L5 which is a negative lens. The above configuration is common among the configurations of the imaging lenses 101 through 103.

In such a manner, the imaging lens 100 includes the negative first lens L1, the positive second lens L2, the negative third lens L3, the aperture stop St, the positive fourth lens L4, and the negative fifth lens L5, in this order from the object side.

Note that the imaging lens 101 is configured such that the first lens L1 is a biconvex lens and to satisfy the conditional expressions (1a) and (2a) given below at the same time:

$$0 < f23/f < 2.5 \quad (1a);$$

and $$0 < f45/f < 6 \quad (2a).$$

It is desirable for this imaging lens 101 to satisfy the conditional expression (1a'): $0.6 < f23/f < 2$, and more desirably the conditional expression (1a"): $1 < f23/f < 1.8$. It is further desirable for this imaging lens 101 to satisfy the conditional expression (2a'): $0.5 < f45/f < 5.5$, and more desirably the conditional expression (2a"): $2 < f45/f < 5$.

The imaging lens 102 is configured to satisfy the following conditional expressions (1b) and (2b) at the same time:

$$0.9 < f23/f < 2.4 \quad (1b);$$

and $$2.8 < f45/f < 6 \quad (2b).$$

It is desirable for the imaging lens 102 to satisfy the conditional expression (1b'): $1 < f23/f < 2$, and more desirably the conditional expression (1b"): $1.1 < f23/f < 1.6$. Further, it is desirable for the second imaging lens to satisfy the conditional expression (2b'): $2.9 < f45/f < 5$, and more desirably the conditional expression (2b"): $3 < f45/f < 4.2$.

The imagine lens 103 is configured to include a cemented lens having a positive refractive power as a whole, formed by cementing the fourth lens L4 and the fifth lens L5 together, and to satisfy conditional expression (3a) given below:

$$0.9 < fg2/f < 1.8 \quad (3a).$$

It is desirable for the third imaging lens 103 to satisfy the conditional expression (3a'): $1 < fg2/f < 1.6$, and more desirably the conditional expression (3a"): $1.05 < fg2/f < 1.4$.

Further, the above imaging lens 100 can be configured in the following manner.

In each of the imaging lenses 102 and 103, the first lens L1 may be a biconcave lens.

In each of the imaging lenses 102 and 103, the second lens L2 may be a biconvex lens, the third lens L3 may be a negative lens with a concave surface toward the object side, the fourth lens L4 may be a biconvex lens, and the fifth lens L5 may be a negative lens with a concave surface toward the object side.

In each of the imaging lenses 102 and 103, the third lens L3 may be a meniscus lens. Alternatively, the fifth lens L5 may be a meniscus lens.

The imaging lenses 102 and 103 may include a cemented lens having a positive refractive power as a whole, formed by cementing the fourth lens and the fifth lens together.

Each of the imaging lenses 101 and 102 may satisfy the conditional expression (3b): $0.5 < fg2/f < 2.5$. It is desirable for the imaging lenses 101 and 102 to satisfy the conditional expression (3b'): $0.9 < fg2/f < 1.8$, and more desirably the conditional expression (3b"): $1 < fg2/f < 1.3$.

Each of the imaging lenses 101 through 103 may satisfy the conditional expression (4): $-2 < f1/fg2 < 0$. It should be noted that it is desirable for the imaging lenses 101 through 103 to satisfy the conditional expression (4'): $-1 < f1/fg2 < -0.5$, and more desirably the conditional expression (4"): $-0.9 < f1/fg2 < -0.6$.

Each of the imaging lenses 101 through 103 may satisfy the conditional expression (5): $1.5 < (dsi)/f < 3.2$. It is desirable for the imaging lenses 101 through 103 to satisfy the conditional expression (5'): $1.8 < (dsi)/f < 2.8$, and more desirably the conditional expression (5"): $2 < (dsi)/f < 2.5$.

Each of the imaging lenses 101 through 103 may satisfy the conditional expression (6): $0.42 < (dsi)/L < 1$. It is desirable for the imaging lenses 101 through 103 to satisfy the conditional expression (6'): $0.45 < (dsi)/L < 0.9$, and more desirably the conditional expression (6"): $0.48 < (dsi)/L < 0.8$.

The effects of the conditional expressions will now be described collectively below.

[Effects of Conditional Expressions which Define the Range of f23/f]

Each of the conditional expressions (1a) and (1b) defines the range of the ratio of the combined focal length f23 of the second lens and the third lens to the focal length f of the entire lens system.

By configuring the imaging lens and the imaging apparatus to satisfy the conditional expressions (1a) and (1b), various aberrations can be suppressed while controlling the size of the beam diameter at a position within the entire lens system at which the height with respect to the optical axis Z1 of an axial beam is the highest.

If the value of f23/f exceeds the upper limit defined by the conditional expression (1a) or (1b), the aberration will be favorable, but the total optical length L will be increased. If the increase in the total optical length L is suppressed, the difference (swelling of spherical aberration) between the spherical aberration of the marginal rays and the spherical aberration of the rays passing through the ray height corresponding to the vicinity of 70% of that of the marginal rays will be increased. If the value of f23/f is lower than the lower limit defined by the conditional expression (1a) or (1b), spherical aberration will be insufficiently corrected, i.e., will be under-corrected (insufficient correction).

The operations and effects of the aforementioned conditional expressions (1a'), (1a"), (1b'), and (1b") are identical to those of the conditional expressions (1a) and (1b) above.

[Effects of Conditional Expressions which Define the Range of f45/f]

Each of the conditional expressions (2a) and (2b) defines the range of the ratio of the combined focal length f45 of the fourth lens and the fifth lens to the focal length f of the entire lens system.

By configuring the imaging lens and the imaging apparatus to satisfy the conditional expressions (2a) and (2b), a reduction in size can be provided while maintaining balance among various aberrations.

If the value of f45/f exceeds the upper limit defined by the conditional expression (2a) or (2b), the tangential image plane will be inclined to the under side. If the value of f45/f is lower than the lower limit defined by the conditional expression (2a) or (2b), spherical aberration will be inclined to the under side.

The operations and effects of the aforementioned conditional expressions (2a'), (2a"), (2b') and (2b") are identical to those of the conditional expressions (2a) and (2b).

[Effects of Conditional Expressions which Define the Range of fg2/f]

Each of the conditional expressions (3a) and (3b) defines the range of the ratio of the focal length (the combined focal length of the second lens L2 through the fifth lens L5) fg2 of the second lens group G2 to the focal length f of the entire lens system.

By configuring the imaging lens and the imaging apparatus to satisfy the conditional expression (3a) or (3b), a reduction in size can be provided while increasing the back focus.

If the value of fg2/f exceeds the upper limit defined by the conditional expression (3a) or (3b), the focal length of the second lens group G2 will be long, thereby increasing the total optical length L. If the increase in the total optical length L is suppressed, swelling of spherical aberration will be increased, and thereby degrading the performance, as described above. If the value of fg2/f is lower than the lower limit defined by the conditional expression (3a) or (3b), the total optical length L will tend to be reduced, but spherical aberration will be inclined to the underside, which causes a lack of correction for the spherical aberration.

The operations and effects of the aforementioned conditional expressions (3a'), (3a"), (3b') and (3b") are identical to those of the conditional expressions (3a) and (3b).

[Effects of Conditional Expression which Defines the Range of f1/fg2]

The conditional expression (4) defines the range of the ratio of the focal length f1 of the first lens group 1G to the focal length fg2 of the second lens group 2G.

By configuring the imaging lens and the imaging apparatus to satisfy the conditional expression (4), a reduction in size can be provided while maintaining balance between a spherical surface and an image plane adequately.

If the value of f1/fg2 exceeds the upper limit defined by the conditional expression (4), a long back focus will be easily secured, but spherical aberration will be over-corrected. If the value of f1/fg2 is lower than the lower limit defined by the conditional expression (4), the refractive power of the first lens group 1G will be lower than that of the second lens group 2G, so that the back focus is reduced and the image plane is inclined to the under side.

The operations and effects of the aforementioned conditional expressions (4') and (4") are identical to those of the conditional expression (4) above.

[Effects of Conditional Expression which Defines the Range of (dsi)/f]

The conditional expression (5) defines the range of the ratio of the distance dsi between an aperture stop St and the image formation surface Km on the optical axis Z1 to the focal length f of the entire lens system.

By configuring the imaging lens and the imaging apparatus to satisfy the conditional expression (5), downsizing of the imaging lens and the imaging apparatus can be achieved.

If the value of dsi/f exceeds the upper limit defined by the conditional expression (5), the total optical length L will be increased. If the value of dsi/f is lower than the lower limit defined by the conditional expression (5), the back focus will be reduced.

The operations and effects of the aforementioned conditional expressions (5') and (5") are identical to those of the conditional expression (5).

[Effects of Conditional Expression which Defines the Range of (dsi)/L]

The conditional expression (6) defines the range of the ratio of the distance dsi between an aperture stop St and the image formation surface Km on the optical axis Z1 to the total optical length L.

By configuring the imaging lens and the imaging apparatus to satisfy the conditional expression (6), downsizing of the imaging lens and the imaging apparatus can be achieved.

If the value of dsi/L exceeds the upper limit defined by the conditional expression (6), the distance between the first lens Group G1 and the second lens Group G2 will be decreased, thereby generating high-order spherical aberration and degrading the optical performance. If the value of dsi/L is lower than the lower limit defined by the conditional expression (6), the total optical length will be increased. If the increase in the total optical length L is suppressed, swelling of spherical aberration will be increased, thereby degrading the performance.

The operations and effects of the aforementioned conditional expressions (6') and (6") are identical to those of the conditional expression (6).

When applying the imaging lens 100 described above to the imaging apparatus 200, optical elements LL having substantially no refractive power, such as a cover glass, a low-pass filter, an infrared cut filter, and the like may be disposed between the imaging lens 100 and the imaging device 210 according to the configuration of the imaging apparatus 200. For example, if each imaging lens 100 is mounted on an in-vehicle camera and the camera is used as a night surveillance camera, it is preferable for a filter that cuts light having wavelengths ranging from ultraviolet to blue light to be inserted between the imaging lens 100 and the imaging device 210.

Instead of disposing a low-pass filter and various types of filters that cut specific wavelength regions between each imaging lens 100 and each imaging device 210, various types of filters may be disposed between the lenses constituting the imaging lens or thin films having identical effects to those of the various types of filters may also be formed (applying coatings) on the lens surfaces constituting the imaging lens.

If the imaging lens 100 is used, for example, for outdoor surveillance, the imaging lens is required to be usable in a wide temperature range from the open air in a cold region to the interior of a car during the summer in a tropical region. In such a case, it is preferable for the material of all of the lenses constituting each imaging lens to be glass. Further, all of the lenses constituting each imaging lens are preferably spherical lenses in order to manufacture the lenses inexpensively. In a case where priority is given to the optical performance over the cost, however, aspherical lenses may be employed.

EXAMPLES

Examples that illustrate specific numerical data of the imaging lenses according to the present invention will now be described.

Numerical data and the like of each of Examples 1 through 5 of the imaging lens of the present invention will be described collectively with reference to FIGS. 2 through 6, FIGS. 7 through 11, and Tables 1 through 6. In FIGS. 2 through 6, symbols corresponding to those in FIG. 1 described above indicate corresponding components.

Note that each of the imaging lenses of Examples 1 through 5 is configured to satisfy all of the conditional expressions described above. The lenses constituting each imaging lens of Examples 1 through 5 are all spherical lenses.

Example 1

Figure 2:
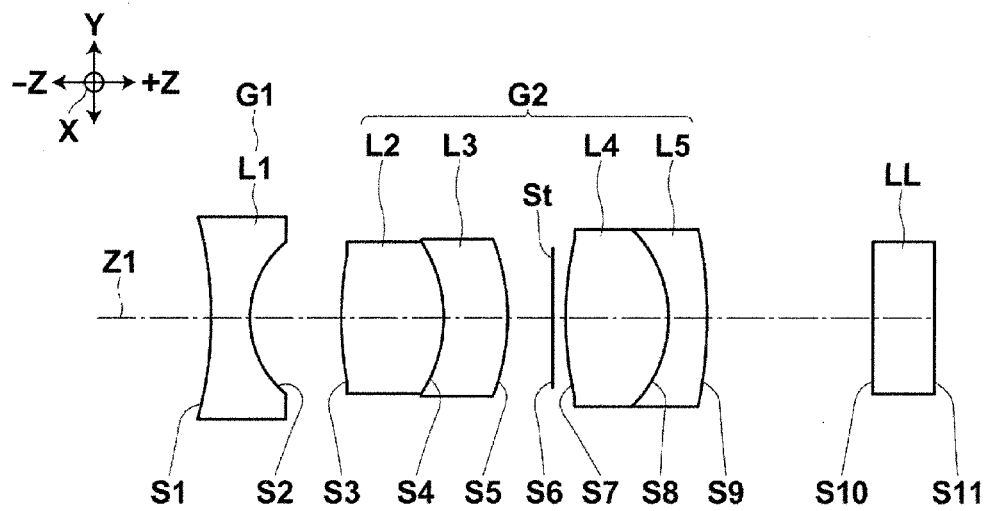
FIG. 2 is a cross-sectional view of a schematic configuration of an imaging lens of Example 1.

FIG. 2 illustrates a cross-sectional view of a schematic configuration of an imaging lens of Example 1.

Table 1 shows lens data of the imaging lens of Example 1. In the lens data shown in Table 1, the surface number i represents $i^{th}$ surfaces Si in which a number i (i=1, 2, 3, - - - ) is given to each surface in a serially increasing manner toward the image side with the most object side surface being designated as the first surface. In the lens data shown in Table 1, the surface number is given also to an aperture stop St and an optical element LL having no power.

The symbol Ri in Table 1 represents radii of curvature of $i^{th}$ (i=1, 2, 3, - - - ) surfaces and the symbol Di represents surface distances between $i^{th}$ (i=1, 2, 3, - - - ) surfaces and $(i+1)^{th}$ surfaces along the optical axis Z1. The numerical values of the symbols Ri and Di correspond to the numerical values of the symbol Si (i=1, 2, 3, - - - ), which represent lens surfaces, the aperture stop, and the like.

The symbol Ndj represents the refractive indices of $j^{th}$ optical elements with respect to the d-line (587.6 nm) in which a number j (j=1, 2, 3, - - - ) is given to each optical element in a serially increasing manner toward the image side with the optical element on the most object side being designated as the first optical element, and vdj represents the Abbe number of $j^{th}$ optical element with respect to the d-line. In Table 1, the unit of the radius of curvature and the surface distance is mm, and the radius of curvature is positive if the surface is convex on the object side and negative if it is convex on the image side.

Because such optical systems as described above may generally maintain a predetermined level of performance when the sizes of the optical elements, such as lenses and the like, are proportionally increased or decreased, imaging lenses in which the entire lens data described above are proportionally increased or decreased may also be the examples according to the present invention.

TABLE 1

EXAMPLE 1
LENS DATA

| SURFACE NUMBER | Ri | Di | Ndj | vdj |
|---|---|---|---|---|
| 1 | −15.5690 | 1.50 | 1.516330 | 64.1 |
| 2 | 3.9104 | 3.59 | | |
| 3 | 14.3250 | 4.00 | 1.743198 | 49.3 |
| 4 | −5.5431 | 2.50 | 1.800000 | 29.8 |
| 5 | −8.4605 | 1.78 | | |
| (St) 6 | ∞ | 0.50 | | |
| 7 | 14.1349 | 4.00 | 1.620411 | 60.3 |
| 8 | −5.0061 | 1.51 | 1.846660 | 23.8 |
| 9 | −17.7288 | 6.48 | | |
| 10 | ∞ | 2.41 | 1.516330 | 64.1 |
| 11 | ∞ | | | |

FIG. 7 shows aberration diagrams of the imaging lens of Example 1. FIG. 7 illustrates spherical aberration, astigmatism, distortion (distortion aberration), and lateral chromatic aberration. Diagrams indicated by the symbol (a) represent spherical aberration, diagrams indicated by the symbol (b) represent astigmatism, diagrams indicated by the symbol (c) represent distortion, and diagrams indicated by the symbol (d) represent lateral chromatic aberration.

FIG. 7 illustrates various aberrations for the light having each wavelength of the d-line, the F-line, and the C-line.

In the astigmatism diagram, the solid line represents aberration in a sagittal direction, and the broken line represents aberration in a tangential direction. Further, F described above the spherical aberration diagram refers to the F-number, and ω described above the other aberration diagrams refers to the half angle of view.

Table 6 shows the values that can be obtained by the numerical expression in each conditional expression with respect to each of Examples 1 to 5. The value of the numerical expression in each conditional expression may be obtained from the lens data shown in Table 1.

As can be seen from the lens data and the like given above, the imaging lens of Example 1 can be an imaging lens being compact with a low F-number and a wide angle of view, in which various aberrations are favorably corrected.

FIG. 2 illustrating a configuration of the imaging lens of Example 1, FIG. 7 illustrating aberrations of the imaging lens, Table 1 representing the lens data, and Table 6 regarding each conditional expression are to be read in the same manner as in Examples through 5 to be described later, and therefore detailed descriptions thereof will be omitted.

Example 2

FIG. 3 illustrates a cross-sectional view of a schematic configuration of the imaging lens of Example 2.

The imaging lens of Example 2 is configured to satisfy all of the conditional expressions above.

FIG. 8 illustrates various aberrations of the imaging lens of Example 2.

Table 2 given below shows lens data of Example 2.

TABLE 2

EXAMPLE 2
LENS DATA

| SURFACE NUMBER | Ri | Di | Ndj | vdj |
|---|---|---|---|---|
| 1 | −15.8090 | 1.50 | 1.516330 | 64.1 |
| 2 | 3.8948 | 3.73 | | |
| 3 | 13.5500 | 4.00 | 1.743997 | 44.8 |
| 4 | −5.5745 | 2.50 | 1.805181 | 25.4 |
| 5 | −8.5313 | 1.44 | | |
| (St) 6 | ∞ | 0.50 | | |
| 7 | 13.8012 | 4.00 | 1.620411 | 60.3 |
| 8 | −4.8803 | 1.75 | 1.846660 | 23.8 |
| 9 | −19.2951 | 6.39 | | |
| 10 | ∞ | 2.41 | 1.516330 | 64.1 |
| 11 | ∞ | | | |

Example 3

FIG. 4 is a cross-sectional view of a schematic configuration of an imaging lens of Example 3.

The imaging lens of Example 3 is configured to satisfy all of the conditional expressions above.

FIG. 9 shows various aberration diagrams of the imaging lens of Example 3.

Table 3 given below represents lens data of the imaging lens of Example 3.

TABLE 3

EXAMPLE 3
LENS DATA

| SURFACE NUMBER | Ri | Di | Ndj | vdj |
|---|---|---|---|---|
| 1 | −16.7703 | 1.50 | 1.516330 | 64.1 |
| 2 | 4.0075 | 4.01 | | |
| 3 | 14.6418 | 4.00 | 1.743198 | 49.3 |
| 4 | −5.7470 | 2.50 | 1.800000 | 29.8 |
| 5 | −8.9282 | 2.00 | | |
| (St) 6 | ∞ | 0.50 | | |
| 7 | 13.3063 | 4.00 | 1.618000 | 63.3 |
| 8 | −4.9282 | 1.50 | 1.805181 | 25.4 |
| 9 | −21.3642 | 6.37 | | |
| 10 | ∞ | 2.41 | 1.516330 | 64.1 |
| 11 | ∞ | | | |

Example 4

FIG. 5 is a cross-sectional view of a schematic configuration of an imaging lens of Example 4.

The imaging lens of Example 4 is configured to satisfy all of the conditional expressions above.

FIG. 10 shows various aberration diagrams of the imaging lens of Example 4.

Table 4 given below represents lens data of the imaging lens of Example 4.

TABLE 4

EXAMPLE 4
LENS DATA

| SURFACE NUMBER | Ri | Di | Ndj | vdj |
|---|---|---|---|---|
| 1 | −14.8666 | 1.50 | 1.589130 | 61.1 |
| 2 | 4.1615 | 3.20 | | |
| 3 | 13.0088 | 4.00 | 1.743198 | 49.3 |
| 4 | −5.6470 | 2.50 | 1.800000 | 29.8 |
| 5 | −8.6968 | 2.28 | | |
| (St) 6 | ∞ | 0.50 | | |
| 7 | 13.3453 | 4.00 | 1.620411 | 60.3 |
| 8 | −4.9856 | 1.50 | 1.846660 | 23.8 |
| 9 | −16.3217 | 6.72 | | |
| 10 | ∞ | 2.41 | 1.516330 | 64.1 |
| 11 | ∞ | | | |

Example 5

FIG. 6 is a cross-sectional view of a schematic configuration of an imaging lens of Example 5.

The imaging lens of Example 5 is configured to satisfy all of the conditional expressions above.

FIG. 11 shows various aberration diagrams of the imaging lens of Example 5.

Table 5 given below represents lens data of the imaging lens of Example 5.

TABLE 5

EXAMPLE 5
LENS DATA

| SURFACE NUMBER | Ri | Di | Ndj | vdj |
|---|---|---|---|---|
| 1 | −13.4935 | 2.07 | 1.589130 | 61.1 |
| 2 | 4.1183 | 2.78 | | |
| 3 | 11.1201 | 4.00 | 1.743997 | 44.8 |
| 4 | −5.5546 | 2.50 | 1.805181 | 25.4 |
| 5 | −8.4863 | 2.07 | | |

TABLE 5-continued

EXAMPLE 5
LENS DATA

| SURFACE NUMBER | Ri | Di | Ndj | vdj |
|---|---|---|---|---|
| (St) 6 | ∞ | 0.50 | | |
| 7 | 13.8859 | 2.97 | 1.618000 | 63.3 |
| 8 | −4.6958 | 1.50 | 1.805181 | 25.4 |
| 9 | −17.3146 | 7.02 | | |
| 10 | ∞ | 2.41 | 1.516330 | 64.1 |
| 11 | ∞ | | | |

Table 6 given below represents the value with respect to each conditional expression as described above.

TABLE 6

| MATHEMATICAL EXPRESSION | EXAMPLE 1 | EXAMPLE 2 | EXAMPLE 3 | EXAMPLE 4 | EXAMPLE 5 |
|---|---|---|---|---|---|
| f23/f | 1.34 | 1.33 | 1.4 | 1.32 | 1.24 |
| f45/f | 3.52 | 3.8 | 3.8 | 3.11 | 3.2 |
| fg2/f | 1.16 | 1.14 | 1.19 | 1.17 | 1.12 |
| f1/fg2 | −0.82 | −0.83 | −0.84 | −0.74 | −0.74 |
| dsi/f | 2.28 | 2.3 | 2.26 | 2.31 | 2.19 |
| dsi/L | 0.51 | 0.52 | 0.5 | 0.71 | 0.5 |

As can be seen from the foregoing, the imaging lenses of Examples 1 to 5 are compact with a low F-number and a wide angle of view, in which various aberrations are favorably corrected.

FIG. 12 illustrates a schematic configuration of a surveillance camera, as a specific example of an embodiment of the imaging apparatus of the present invention. The surveillance camera 200 illustrated in FIG. 12 includes an imaging lens 100 disposed in a substantially cylindrical lens barrel and an imaging device 210 that captures an optical image of a subject formed by the imaging lens 100. The optical image formed on the light receiving surface of the imaging device 210 through the imaging lens 100 is converted to an electrical signal Gs and outputted from the surveillance camera 200.

So far the present invention has been described by way of the imaging lens of each of the first through the third embodiments, the imaging apparatus of each of the first to the third embodiments and Examples 1 through 5. However, the present invention is not limited to the embodiments and Examples described above and various modifications may be made. For example, values of the radius of curvature of each lens element, surface distance, refractive index, Abbe number, and the like are not limited to those shown in each Numerical Example and may take other values.

In the embodiment of the imaging apparatus, the description and illustration have been made of a case in which the present invention is applied to a surveillance camera. But the present invention is not limited to such applications and is applicable, for example, to video cameras, electronic still cameras, portable terminal cameras, in-vehicle cameras, readout cameras intended for sensing defects and identifying individual objects, and the like.

What is claimed is:

1. An imaging lens, substantially consisting of in the recited order from an object side:
    a negative first lens group consisting of only a first lens, which is a single biconcave lens; and
    a positive second lens group consisting of, in the recited order from the object side, a cemented lens that is formed by bonding a second lens, which is a positive lens, and a third lens, which is a negative lens, in this order from the object side and that has a positive refractive power as a whole; an aperture stop; a fourth lens, which is a positive lens; and a fifth lens which is a negative lens, the imaging lens having no lens elements other than the lens elements in the negative first lens group and the positive second lens group, wherein the imaging lens is a fixed focal length lens system and satisfies conditional expressions (1a) and (2a) given below at the same time:

$$0 < f23/f < 2.5 \quad (1a);$$

and $$0 < f45/f < 6 \quad (2a),$$

where:
f23: the combined focal length of the second lens and the third lens;
f45: the combined focal length of the fourth lens and the fifth lens; and
f: the focal length of the entire lens system.

2. The imaging lens of claim 1, wherein the imaging lens satisfies conditional expression (1a') given below:

$$0.6 < f23/f < 2 \quad (1a').$$

3. The imaging lens of claim 1, wherein the imaging lens satisfies conditional expression (1a'') given below:

$$1 < f23/f < 1.8 \quad (1a'').$$

4. The imaging lens of claim 1, wherein the imaging lens satisfies conditional expression (2a') given below:

$$0.5 < f45/f < 5.5 \quad (2a').$$

5. The imaging lens of claim 1, wherein the imaging lens satisfies conditional expression (2a'') given below:

$$2 < f45/f < 5 \quad (2a'').$$

6. An imaging lens, substantially consisting of in the recited order from an object side:
a negative first lens group consisting of only a first lens, which is a single negative lens; and
a positive second lens group consisting of, in the recited order from the object side, a cemented lens that is formed by bonding a second lens, which is a positive lens, and a third lens, which is a negative lens, in this order from the object side and that has a positive refractive power as a whole; an aperture stop; a fourth lens, which is a positive lens; and a fifth lens which is a negative lens,
the imaging lens having no lens elements other than the lens elements in the negative first lens group and the positive second lens group,
wherein the imaging lens is a fixed focal length lens system and satisfies conditional expressions (1b) and (2b) given below at the same time:

$$0.9 < f23/f < 2.4 \quad (1b);$$

and $$2.8 < f45/f < 6 \quad (2b),$$

where:
f23: the combined focal length of the second lens and the third lens;
f45: the combined focal length of the fourth lens and the fifth lens; and
f: the focal length of the entire lens system.

7. The imaging lens of claim 6, wherein the imaging lens satisfies conditional expression (1b') given below:

$$1 < f23/f < 2 \quad (1b').$$

8. The imaging lens of claim 6, wherein the imaging lens satisfies conditional expression (1b'') given below:

$$1.1 < f23/f < 1.6 \quad (1b'').$$

9. The imaging lens of claim 6, wherein the imaging lens satisfies conditional expression (2b') given below:

$$2.9 < f45/f < 5 \quad (2b').$$

10. The imaging lens of claim 6, wherein the imaging lens satisfies conditional expression (2b'') given below:

$$3 < f45/f < 4.2 \quad (2b'').$$

11. The imaging lens of claim 6, wherein the first lens is a biconcave lens.

12. The imaging lens of claim 6, wherein the second lens which is a biconvex lens, the third lens which is a negative lens with a concave surface toward the object side, the fourth lens which is a biconvex lens, and the fifth lens which is a negative lens with a concave surface toward the object side.

13. The imaging lens of claim 6, the third lens has a meniscus shape.

14. The imaging lens of claim 6, the fifth lens has a meniscus shape.

15. The imaging lens of claim 6, wherein the imaging lens comprises a cemented lens, which is formed by cementing the fourth lens and the fifth lens together and which has a positive refractive power as a whole.

16. The imaging lens of claim 1, wherein the imaging lens satisfies conditional expression (3b) given below:

$$0.5 < fg2/f < 2.5 \quad (3b),$$

where:
fg2: the focal length of the second lens group; and
f: the focal length of the entire lens system.

17. The imaging lens of claim 1, wherein the imaging lens satisfies conditional expression (4) given below:

$$-2 < f1/fg2 < 0 \quad (4),$$

where:
f1: the focal length of the first lens; and
fg2: the focal length of the second lens group.

18. The imaging lens of claim 1, wherein the imaging lens satisfies conditional expression (5) given below:

$$1.5 < (dsi)/f < 3.2 \quad (5),$$

where:
dsi: the distance between an aperture stop and an image formation surface on the optical axis; and
f: the focal length of the entire lens system.

19. The imaging lens of claim 1, wherein the imaging lens satisfies conditional expression (6) given below:

$$0.42 < (dsi)/L < 1 \quad (6),$$

where:
L: the total optical length.

20. A camera comprising the imaging lens of claim 1 and an imaging device that captures an optical image formed by the imaging lens.

21. A camera comprising the imaging lens of claim 6 and an imaging device that captures an optical image formed by the imaging lens.

* * * * *